United States Patent [19]

Richard, Jr.

[11] 4,274,440
[45] Jun. 23, 1981

[54] PRECISION GAS PRESSURE REGULATION

[76] Inventor: Samuel J. Richard, Jr., P. O. Box 8246, South Charleston, W. Va. 25303

[21] Appl. No.: 368

[22] Filed: Dec. 29, 1978

[51] Int. Cl.³ .................................... G05D 16/00
[52] U.S. Cl. .................................. 137/613; 137/489; 137/492
[58] Field of Search ............... 137/489, 492, 492.5, 137/613

[56] References Cited

U.S. PATENT DOCUMENTS

| 843,174 | 2/1907 | Reynolds | 137/489 |
|---|---|---|---|
| 1,982,045 | 11/1934 | Clithero | 137/489 X |
| 2,071,871 | 2/1937 | Cleveland | 137/489 X |
| 2,627,703 | 2/1953 | Spencer | 137/489 X |
| 2,690,760 | 10/1954 | Hughes | 137/489 X |
| 2,707,970 | 5/1955 | Hughes | 137/489 |
| 3,405,551 | 10/1968 | Halasz | 137/489 X |

Primary Examiner—Alan Cohan
Attorney, Agent, or Firm—Harvey B. Jacobson

[57] ABSTRACT

Precision gas pressure regulation is disclosed to provide extreme sensitivity, fast response, and positive shut-off of gases for pressurizing a vessel, such as a tank, pressurized room, chamber, duct, and the like, at pressures up to about 2 inches of water column above atmospheric pressure, and as low as about 0.25 inches of water column, with control of pressure within about 0.02 inches of water column within a predetermined pressure within this range. The system is compact, self-contained, and requires no external source of power other than the supply pressure, which can range from about 10 Psig to 1,000 Psig. Redundant pressure relief devices are provided at all points of pressure reduction within the system for maximum safety. Means are provided to prevent condensate build up in internal components, and for uses in which toxic or corrosive gases are contemplated, a purging option permits unwanted material to be swept out of the apparatus.

4 Claims, 3 Drawing Figures

U.S. Patent  Jun. 23, 1981  4,274,440
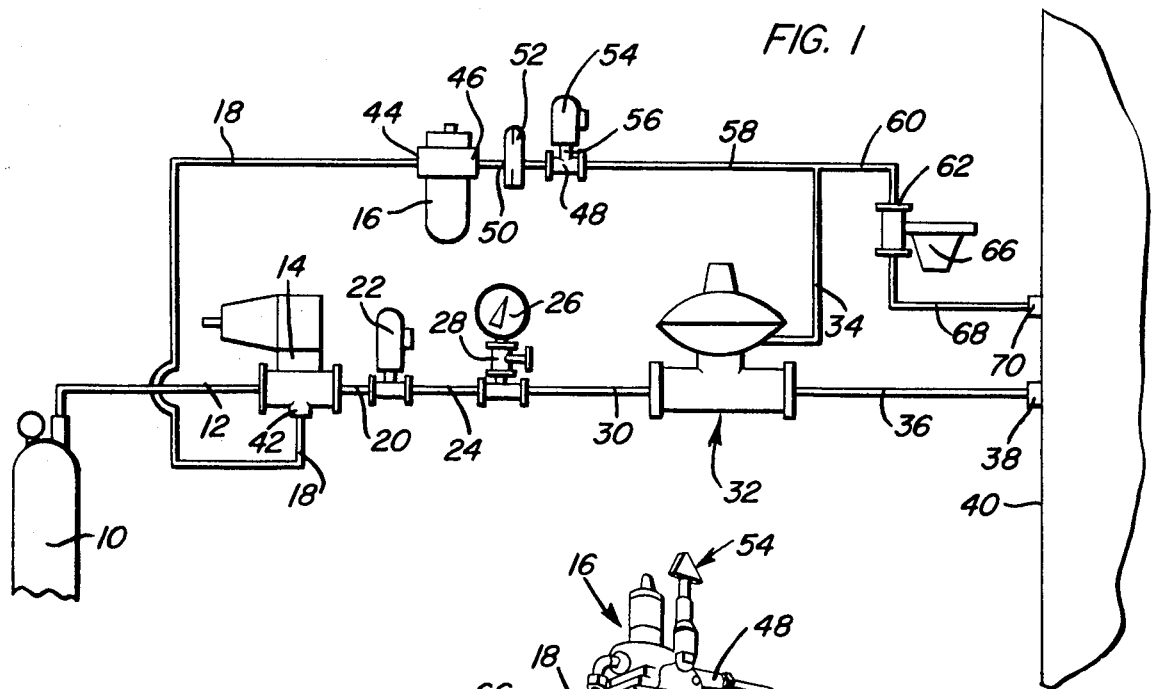
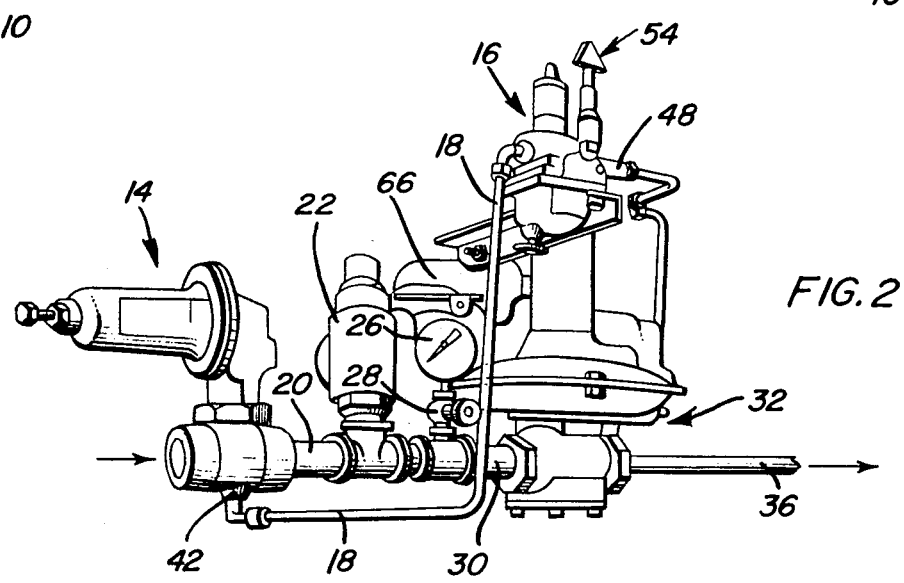
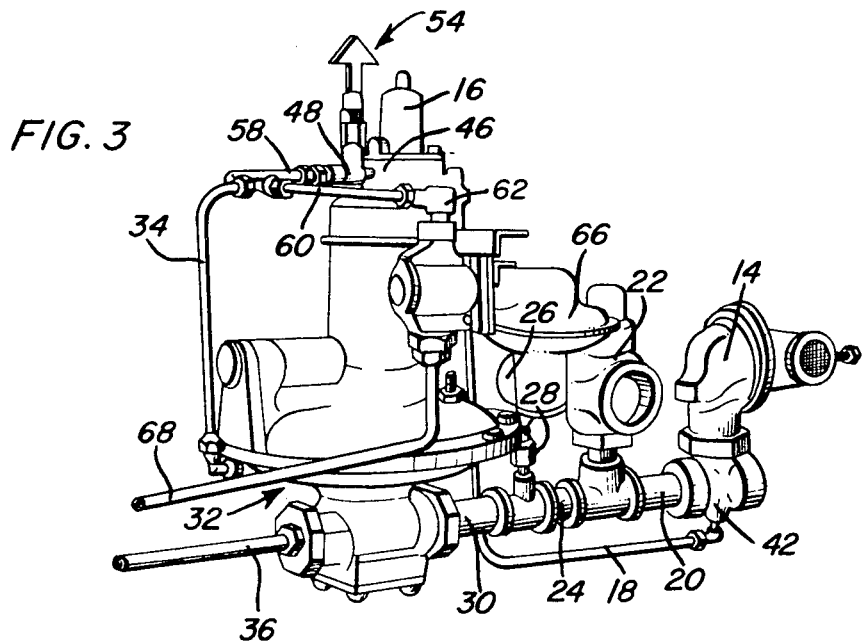

PRECISION GAS PRESSURE REGULATION

BACKGROUND OF THE INVENTION

1. Field of the Invention

The invention relates to pressurizing of a vessel from a selected supply gas at high pressure where the vessel is to be pressurized with precision predetermined value somewhat above atmospheric pressure.

2. Description of the Prior Art

In U.S. Pat. No. 3,021,865, issued Feb. 20, 1962 to Beckett, an external source of pressure provides necessary operating energy to a regulating mechanism which is quite complex mechanically and fails to incorporate safety relief devices for relieving excess pressures within the system. Moreover, the pressure regulator of Beckett fails to disclose a means of draining or relieving either condensed or entrained liquids. Such condensed or entrained liquids, by virtue of their weight alone, acting on the surface of a diaghragm, can render the system of Beckett inoperative. U.S. Pat. No. 3,047,010, issued July 31, 1962 to Rothfuss, and U.S. Pat. No. 3,454,044, issued July 8, 1969 to Mamzic disclose regulating devices which operate from and require an external source of power. Neither patent discloses a self-contained system utilizing the process fluid as the actuating medium. U.S. Pat. No. 1,306,746, issued Dec. 29, 1942 to Niesemann and U.S. Pat. No. 956,283, patented Apr. 26, 1910 by Cash, disclose regulators for maintaining a downstream set pressure of a fluid which is flowing, and neither arrangement would be useful for maintaining low pressures in a vessel, duct or chamber under static or non-flowing conditions.

Other related prior art arrangements are shown in the following patents:

| 2,987,920 | Du Bois | June 13, 1961 |
| 3,411,429 | Bassett | Nov. 19, 1968 |
| 3,271,256 | Bernard | Mar. 20, 1973 |

SUMMARY OF THE INVENTION

As a self-contained unit, the invention is adaptable for use in remote locations where external sources of power, such as electrical, mechanical, or battery power is unavailable or inconvenient. Moreover, the invention is useful for gas pressure regulation under static conditions, even for use with toxic or corrosive gases.

It is a principal object of the invention to regulate with a self-contained system the pressure and kind of gas in a pressurized vessel, such as a pressurizing tank, pressurized room, chamber, duct, or the like, where the pressurizing gas is supplied from a pressurized source, the pressure of which furnishes the only source of power required for operation.

Another object of the invention is to regulate with extreme sensitivity, fast response, and positive shut-off the supplied gas for the vessel.

Still another object of the invention is to furnish control of the vessel pressure within limits of about 0.02 inches of water column, where the vessel pressure ranges from as low as 0.25 inches of water column up to 2 inches of water column over atmospheric pressure.

Yet another object of the invention is to provide a system capable of operation for a supply gas pressure ranging from about 10 Psig to about 1,000 Psig.

A further object of the invention is to provide an arrangement having redundant pressure relief devices provided at all points of pressure reduction within the system for maximum safety.

Yet a further object of the invention is to provide a pressure sensing pilot equipped with a drain to prevent condensate accumulation which could affect operation of the system.

Still a further object of the invention is to provide a purging option for use with supply gases which are toxic or corrosive, whereby unwanted material can be swept out of a sensing line.

A still further object is to achieve these objects with a relatively simple system mechanically, so as to minimize cost of construction, eliminate or reduce maintenance problems, and minimize service interruption time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic representation of a precision gas pressure regulator of the present invention.

FIG. 2 is a perspective view of the arrangement of FIG. 1 in a compact self-contained unit.

FIG. 3 is a perspective view of the arrangement of FIG. 2 from the opposite side.

DESCRIPTION OF THE PREFERRED EMBODIMENT

In FIG. 1, supply gas is furnished from tank 10 at a supply gas pressure of typically up to about 1,000 Psig, connected through inlet line 12 to high pressure reducing regulator 14, which has a built in internal relief valve. Regulator 14 is preferably altered by drilling and tapping a ¼ inch NPT (national pipe thread) connection 42 in the body of regulator 14 to serve as a supply pressure for gauge regulator 16 through connecting line 18. Pressure is reduced by reducing regulator 14 to about 10 Psig in line 20, which is connected to safety relief valve 22, ordinarily set to relieve pressure at about 15 Psig, thereby providing a redundant safety relief should internal relief in reducing regulator 14 fail. Relief valve 22 is connected by line 24 to pressure gauge 26, which is conveniently adapted to measure pressures ranging from 0 to 30 Psig. Shut-off valve 28 is provided to permit gauge 26 to be checked or changed.

Gas then flows through line 30 through diaphragm-type regulator 32, which is a spring to open diaphragm-type regulator altered by plugging its internal pressure sensing port and providing an external pressure connection from line 34. Gas from line 30 flows through regulator 32 and into outlet line 36 and through opening 38 into vessel 40, diaphragm regulator 32 being held open by the internal spring of the regulator. Accordingly, gas flows into vessel 40, which can be a tank, chamber, duct, or room which is undergoing pressurization.

The supply pressure coming from connection 42 on reducing regulator 14 is piped through line 18 to inlet 44 of gauge regulator 16, which is a ¼ inch NPT 0-5 Psig regulator having a built in filter, condensate trap, and internal relief valve. Gauge regulator 16 is ordinarily set for 1.0 Psig outlet pressure. Connected to outlet 46 of gauge regulator 16 is a special ¼ inch NPT pipe street tee 48. Inlet 50 of tee 48 is provided with a small orifice plate 52, soldered in place. The hole comprising this orifice can vary in diameter from a number 80 drill size up to a number 65 drill size, the exact diameter depending on several factors, such as the speed of response needed for adjustment of the pressure in vessel 40, which is determined in part by the volume of vessel 40. Further, the hole diameter in orifice plate 52 depends on the size of diaphragm regulator 32, which can vary from ¾ inch NPT to 4 inch NPT and is sized to fit the volume requirements of the particular use intended. Small safety valve 54 is located in branch 56 of tee 48. Safety valve 54 is ordinarily set for about 2.0 Psig to provide redundant safety relief should internal relief in gauge regulator 16 fail.

The small volume of gas coming through tee 48 is piped through lines 58 and 34 to the external pressure connection of diaphragm regulator 32, and is also piped through line 60 to the inlet side 62 of pilot regulator 66. Pilot regulator 66 is altered as follows:

Pilot regulator 66 is a diaphragm-type regulator installed in an inverted position. A lead weight of approximately 2 ounces is attached to the diaphragm assembly of pilot regulator 66. Since pilot regulator 66 is installed inverted, this weight acts to create a downward force on the entire diaphragm. The diaphragm and lead weight are opposed by a lightweight adjustable spring, and thus when the spring is compressed, a point of equilibrium is reached between the weighted diaphragm assembly and the opposing spring force. Further compression of this spring therefore increases the pressure setting. Further, a slanting drain hole is drilled through the body and diaphragm case of pilot regulator 66. This hole is then counterbored to accept and "O" ring to seal between the body and diaphragm case. Since pilot regulator 66 is installed inverted, any condensate which might normally collect on the diaphragm surface or within the diaphragm case is automatically drained through this hole to the outlet of the regulator.

In some intended uses, vessel 40 may contain toxic, radioactive or corrosive material which might back up in line 68 and affect the operation of the system. In such instances, a small hole can be drilled through the seat of regulator 66, preferably approximately about a number 75 drill size, to provide a constant flow or calibrated leak rate even when pilot regulator 66 is closed. Thus, this constant gas flow provides a purge to sweep toxic or corrosive gases from the sensing system.

The outlet side of pilot regulator 66 is the sensing connection and is connected by sensing line 68 to vessel 40, which is the tank, duct, chamber, or room undergoing pressurization. This connection 70 is separate from connection 38, and line 68 is constructed to avoid low spots, traps, or seals. Line 68 is preferably sloped at least ½ inch per foot so as to be self-draining.

It is apparent from FIGS. 2 and 3, showing an assembled unit comprising each of the components identified in FIG. 1, that the entire system is characterized by a high degree of portability and because of its self-contained nature can be easily and conveniently connected, moved, or carried to a location of use. Inasmuch as an external source of electrical or mechanical energy is unnecessary for operation of the apparatus, no connections to a source of electrical power, battery, or mechanical drive is needed. The incoming arrow shown in FIG. 2 represents the inlet line 12 of FIG. 1, and will be ordinarily connected to a source of gas 10, not shown in FIG. 2 or in FIG. 3. The arrow showing gas exiting the system in FIGS. 2 and 3 represents flow of gas toward vessel 40 through connection 38.

It can be seen that a high degree of compactness and portability results with use of the present invention, coupled with a high degree of precision and safety in actual use.

The following examples illustrate the action of a complete system, but it is not contemplated or intended to limit the generality of the invention thereby:

EXAMPLE I

In the system illustrated in FIGS. 1-3, as described herein, the spring compression in pilot regulator 66 is adjusted to balance at a pressure of a 0.5 inch water column by adjusting the balance between the lightweight adjustable spring and lead weight acting on the diaphragm to produce a balance point at a pressure of 0.5 inches of water. As described above, the outlet of pilot regulator 66 enters vessel 40 at a separate connection 70 from the connection 38 from outlet 36.

As the supply of gas from source 10 passes through the apparatus in the manner described above, a 10 Psig flow of gas passes through diaphragm regulator 32 into line 36 and into vessel 40, resulting in a build-up or accumulation of pressure. This pressure increase is sensed through connection 70 and line 68. As the pressure in vessel 40 approaches 0.5 inch water column, pilot regulator 66, which is set for 0.5 inch water column closes and when a pressure in vessel 40 of 0.5 inch water column is reached, pilot regulator 66 shuts completely. At this point, build-up of pressure coming through tee 48 begins. Inasmuch as no flow through line 60 is possible, the diaphragm of diaphragm regulator 32 begins to compress the spring of diaphragm regulator 32 to initiate closing thereof. Final build-up of the 1.0 Psig pressure in line 34 locks the valve seat of diaphragm regulator 32 to completely shut off flow from line 30 to outlet line 36. As long as the pressure in vessel 40 is held to the 0.5 inch water column level, no flow through line 36 into vessel 40 will occur.

EXAMPLE II

Whenever pressure within vessel 40 drops below the 0.5 inch water column setting, this drop is sensed through line 68 to pilot regulator 66, in response to which regulator 66 begins to open. Since the orifice area within regulator 66 is in excess of the area of tee 48, the pressure within lines 60, 58 and 34 drops to zero with respect to atmospheric pressure. The spring in diaphragm regulator 32 opens diaphragm regulator 32 and allows flow from line 30 through regulator 32 into line 36 until the pressure within vessel 40 has again reached preset value and diaphragm regulator 32 is closed in the manner described above for Example I.

Although the complete system of the present invention has been described as an off-on device, the system has proportional or throttling characteristics, even though the proportional band or throttling range is narrow. The regulating system of the present invention does not exhibit the droop characteristics inherent in most reducing regulators. Thus, if the withdrawal of pressure from pressurized vessel 40 proceeds at a given fixed rate, the regulating system of the present invention will attain an equilibrium point of balance at which inlet flow through outlet line 36 is equal to the outlet flow from vessel 40 and the pressure within vessel 40 is maintained at a preset pressure within a very close tolerance. For example, with use of the present invention, the pressure within vessel 40 can be set as low as about 0.25 inch water column and as high as about 2 inch water column over atmospheric pressure, with control of the pressure in vessel 40 within limits of about ±0.02 inch water column.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gas pressure regulation system for maintaining a predetermined pressure of gas in a vessel comprising; a supply of pressurized gas, a pressure reducing regulator positioned downstream from said gas supply, said pressure reducing regulator including a connection thereon having first and second outlets, a safety relief valve providing a redundant safety relief in the event said reducing regulator fails, said safety relief valve being downstream said first outlet, a pressure gauge downstream said safety relief valve, a first connecting line for supplying said supply of pressurized gas to said pressure reducing regulator, said safety relief valve, said pressure guage and to said pressurized vessel downstream from said pressure gauge, said gas being supplied to said vessel at a pressure higher than said predetermined pressure into a first inlet connection with said vessel, and a control means for sensing said predetermined pressure in said vessel through a second inlet connection with said vessel separate from said first inlet connection, said control means comprising a gauge regulator downstream said second outlet from said reducing regulator, a controlled leak means connected to an outlet of said gauge regulator, a safety valve downstream from said gauge regulator for providing redundant safety relief should internal relief in said gauge regulator fail, a second connecting line from said second outlet to said gauge regulator, said safety valve and from said safety valve to a pilot regulator for supplying control gas through said pilot regulator, said pilot regulator positioned downstream from said safety valve and having adjustable flow means for adjusting the flow therethrough into said second inlet connection into said vessel, whereby the pressure of control gas in said second connecting line is determined by the gas pressure balance between said controlled leak means and said pilot regulator, said control means further including a diaphragm regulator positioned between said pressure gauge and said first inlet connection for control of the rate of flow of gas in said first connecting line to said inlet connection from said reducing pressure regulator, and a gas adjusting line communicating between said second connecting line and said diaphragm regulator whereby the flow of supply gas to said first inlet connection is controlled in response to the pressure of control gas in said second connecting line.

2. The system of claim 1 wherein said controlled leak means comprises an orifice plate having an orifice of predetermined diameter.

3. The system of claim 1 wherein said pilot regulator is connected to said vessel by connecting means sloped at least ½ inch per foot so as to be self-draining, and said connecting means avoids trapping or sealing of condensate between said pilot regulator and said vessel.

4. The system of claim 2 wherein said predetermined diameter of said orifice is the diameter of a number 80 drill size to a number 65 drill size.

* * * * *